United States Patent [19]

Chen

[11] Patent Number: 5,744,138
[45] Date of Patent: Apr. 28, 1998

[54] PROCESS FOR SEPARATING ORGANOGERMANIUM COMPOUNDS AND INORGANOGERMANIUM COMPOUNDS FROM A GERMANIUM-CONTAINING PHARMACEUTICAL PLANT OR ITS PROCESSED PRODUCTS

[75] Inventor: Mon-Tarng Chen, Hsinchu, Taiwan

[73] Assignee: Food Industry Research & Development Institute, Hsinchu, Taiwan

[21] Appl. No.: 761,350

[22] Filed: Dec. 6, 1996

[30] Foreign Application Priority Data

Oct. 21, 1996 [TW] Taiwan .................................. 85112865

[51] Int. Cl.$^6$ ...................... A01N 65/00; A01N 59/16; B01D 15/08
[52] U.S. Cl. .................. 424/195.1; 424/646; 210/656
[58] Field of Search .................. 424/195.1, 646; 210/656

[56] References Cited

U.S. PATENT DOCUMENTS 3,787,317  1/1974  Jaworek ........................................ 210/31

OTHER PUBLICATIONS

Chiang et al., "Germanium Enriched *Ganoderma lucidum* and Its Germanium Content", The Chinese Pharmaceutical Journal, pp. 339–344, vol. 41, No. 4.

Chiang et al., "Improved Method of Assay for Germanium in Crude Drugs", Journal of the Taiwan Pharmaceutical Association, vol. 38, No. 3, (1986).

Chien, et al., "Studies on Ganoderma spp. Cultured in Germanium–enriched Liquid Media", The Chinese Pharmaceutical Journal, vol. 42, No. 4 (1990).

Itano, et al., "Analysis of Germanium Compounds in Health Beverage", pp. 231–237, vol. 33, No. 3, (1992).

Kakimoto et al., "Organogermanium Compounds: Synthesis, Structure, and Properties of Masked Carboxyethylgermanium Sesquioxide (GE-132) and Related Compounds with One Triethanolamine Component", Heterocycles, pp. 347–353, vol. 26, No. 2 (1987).

Tao, et al., "Determination of Germanium, Arsenic, Antimony, Tin and Mercury at Trace Levels by Continuous Hydride Generation–Helium Microwave–Induced Plasma Atomic Emission Spectrometry", Analytical Sciences, pp. 55–59, vol. 7.

*Primary Examiner*—Herbert J. Lilling
*Attorney, Agent, or Firm*—Fish & Richardson P.C.

[57] ABSTRACT

The present invention provides a process for separating organogermanium and inorganogermanium compounds from a germanium-containing pharmaceutical plant or its processed products by applying the extract of a germanium-containing pharmaceutical plant or its processed products into a combination column including a cation exchange resin in the lower part of the column and an anion exchange resin in the upper part of the column, eluting the combination column with deionized water to obtain inorganogermanium solution, then with an alkaline solution to release the organogermanium compounds, and finally with deionized water to obtain organogermanium solution. The present invention also provides a process for determining the total germanium, organogermanium, inorganogermanium content of a germanium-containing pharmaceutical plant or its processed products by ICP-AES.

15 Claims, No Drawings

PROCESS FOR SEPARATING ORGANOGERMANIUM COMPOUNDS AND INORGANOGERMANIUM COMPOUNDS FROM A GERMANIUM-CONTAINING PHARMACEUTICAL PLANT OR ITS PROCESSED PRODUCTS

BACKGROUND OF THE INVENTION

1. Field of the Invention:

The present invention relates to a process for separating organogermanium compounds and inorganogermanium compounds from a germanium-containing pharmaceutical plant or its processed products, also relates to a process for determining the germanium content of a germanium-containing pharmaceutical plant or its processed products.

2. Description of the Prior Art:

In early time, Japanese researchers analyze the anti-cancer plants and found that such anti-cancer plants have a higher germanium content than the ordinary plants. Therefore, it is regarded that the germanium content of a pharmaceutical plant has relationship with the pharmaceutical effect. For example, *Ganoderma ressile* has a very high germanium content up to 22.02 ppm (Chiang et al., 1986, *Journal of the Taiwan Pharmaceutical Association*, Vol. 38, No. 3, p.189–198) and is regarded to have treating effect for cancer, allergy, immunity, hypertension, diabetes, arteriosclerosis and thrombosis.

Therefore, lots of the commercially available processed products of pharmaceutical plants are claimed that they have high germanium content. It is also believed that in the pharmaceutical plants, the organogermanium compounds have more curative effect than the inorganogermanium compounds, thus, what's more, lots of the commercial available processed products of the pharmaceutical plants are claimed that they have high organogermanium content.

However, the organogermanium compounds and inorganogermanium compounds in the pharmaceutical plants or its processed products still can not be separated by the presently-used analytical methods. Therefore, the organogermanium content marked on the processed products is actually the total germanium content. Mis-regarding the total germanium content as the organogermanium content is not appropriate. There is a need to establish a process for separating organogermanium compounds and inorganogermanium compounds from a germanium-containing pharmaceutical plant or its processed products.

Ge-132 (Carboxyethylgermanium sesquioxide) ($(GeCH_2COOH)_2O_3$) is a synthetic organogermanium compound of acid type (Kakimoto et al., 1987, *Heterocycles*, Vol. 26, No. 2, p.347–353) and is claimed to have clinical anti-cancer effect. In Japan, Ge-132 has been added into some health beverages. Using the characteristics that Ge-132 is capable of binding with Dowex 1-X2 ($CH_3COO^-$) resin, Itano et al. have separate the added synthetic Ge-132 and germanium dioxide ($GeO_2$) from the health beverage. However, Itano et al. can only separate the added synthetic Ge-132 and $GeO_2$, no related researches or reports have been ever seen regarding the process of separating the natural organogermanium and inorganogermanium compounds from a pharmaceutical plant or its processed products.

As to the method for determining the total germanium content of a pharmaceutical plant, the colorimetry is often widely used. For example, Chiang et al. (1986) disclose such a process. The pharmaceutical plant sample was first crushed into powders, ashed at 600° C. for 1 hour, extracted, then treated with widely used color agent-phenylfluorone or quercetinsulfonic acid, and measured the absorbance at 507 nm. The disadvantage of such a colorimetric process is that ashing step is required. However, the ashing step destroys the organic portion in plants, thus converting the organogermanium compounds into inorganogermanium compounds. Therefore, the phenylfluorone or quercetinsulfonic acid colorimetric process can only detect the total germanium content (the sum of the organogermanium and inorganogermanium compounds), but can not detect the respective organogermanium or inorganogermanium compounds. Moreover, such colorimetric processes suffer from complex, time-consuming operational procedures.

Tao et al. have attempted to determine the germanium content in water by inductively coupled plasma atomic emission spectroscopy (ICP-AES) (*Analytical Sciences*, Vol. 7, p.55–59, 1991). However, until now, no one has ever attempted to determine the total germanium content, even organogermanium and inorganogermanium content in pharmaceutical plants or their processed products by ICP-AES.

SUMMARY OF THE INVENTION

Therefore, an object of the present invention is to solve the above-mentioned problems and to provide a process for effectively separating organogermanium compounds and inorganogermanium compounds from a germanium-containing pharmaceutical plant or its processed products.

Another object of the present invention is to provide a process for determining the total germanium content, organogermanium content and inorganogermanium content of a germanium-containing pharmaceutical plant or its processed products.

To achieve the above objects, according to the present invention, the process for separating organogermanium compounds and inorganogermanium compounds from a germanium-containing pharmaceutical plant or its processed products includes the following sequential steps of:

(a) providing an extract of a germanium-containing pharmaceutical plant or its processed products;

(b) applying the extract into a combination column including a cation exchange resin in the lower part of the column and an anion exchange resin in the upper part of the column, whereby organogermanium compounds in the extract is capable of binding with the anion exchange resin in the upper part of the column;

(c) eluting the combination column with deionized water and collecting the eluate so as to obtain inorganogermanium solution containing substantially no organogermanium compounds;

(d) eluting the combination column with an alkaline solution, whereby the organogermanium compounds previously bound with the anion exchange resin release, and the alkaline matrix of the alkaline solution binds with the cation exchange resin in the lower part of the column; and (e) eluting the combination column with deionized water and collecting the eluate so as to obtain organogermanium solution containing substantially no inorganogermanium compounds.

The process for determining the total germanium content, organogermanium content or inorganogermanium content of a germanium-containing pharmaceutical plant or its processed products is determined by ICP-AES.

According to one aspect of the present invention, when the extract of a germanium-containing pharmaceutical plant or its processed products is applying to the combination column of the present invention, the organogermanium compounds can bind to the anion exchange resin in the upper part of the combination column and then was released by the elution with an alkaline solution.

According to another aspect of the present invention, the alkaline matrix of the alkaline solution used for releasing the organogermanium compounds can be removed by the cation exchange resin in the lower part of the combination column. Thus, when the collected organogermanium solution is subjected to further determination, the results are not adversely interfered or affected since no residual alkaline matrix is present.

DETAILED DESCRIPTION OF THE INVENTION

In general, it is believed that the inherent natural organogermanium compounds in natural pharmaceutical plants (such as Ganoderma species) is more effective than the synthetic ones. However, since the Ganoderma containing high content of organogermanium compounds is not easy to attain, adding germanium dioxide or Ge-132 to the culture medium of Ganoderma to induce absorbance and conversion is a commonly-used way to increase the organogermanium content in Ganoderma (Chiang et al., 1989, *Journal of the Taiwan Pharmaceutical Association*, Vol. 41, No. 4, p.339–344) (Chien et al., 1990 *Journal of the Taiwan Pharmaceutical Association*, Vol. 42, No. 4, p.355–361). The *Ganoderma lucidum* used in the following example of the present invention does not have enough high inherent organogermanium content, thus, germanium dioxide is added to the culture medium of *Ganoderma lucidum* to make $GeO_2$ absorbed and converted in *Ganoderma lucidum*, such that the organogermanium content can be increased.

Chiang et al. (The Project Report of National Science Council, No. 76-0208-M008-14) point out that organogermanium compound is easily dissolved in a strong polar solvent. For example, 0.01N sodium hydroxide aqueous solution has a higher extraction efficiency to the germanium-enriched *Ganoderma lucidum*. This proves that the organogermanium compound may be present in the form of an acid type polymer.

According to the present invention, an alkaline solution is used to extract the germanium component in the pharmaceutical plant or its processed products. Since it is proven that the organogermanium compound may be present in the form of an acid type polymer, therefore, in theory, any alkaline solution can be used to extract the germanium component in the pharmaceutical plant or its processed products. Representative examples of such alkaline solutions includes an aqueous solution of a hydroxide of an alkaline metal or an alkaline earth metal, such as sodium hydroxide, potassium hydroxide, magnesium hydroxide and calcium hydroxide.

After the extraction with the alkaline solution, the obtained extract is alkaline, this may influence or interfere the following germanium content determination result. Therefore, before determining germanium content, the alkaline matrix in the extract should be removed. The alkaline matrix can be removed by any conventional method, or alternatively, can be removed by a separation column packed with a cation exchange resin. The cation (such as sodium ion) in the alkaline extract is capable of exchange with the cation (such as hydrogen ion) in the cation exchange resin, thus the alkaline matrix can be removed. Cation exchange resin suitable for use in the present invention can be a hydrogen ion type, and the functional group of the cation exchange resin can be $-SO_3^-$. Representative commercially available examples of such cation exchange resins include Dowex 50W-X8, AG 50W-X8, Amberlite CG-120 and Duolite 225.

Subsequently, the alkaline matrix-removed extract is then subjected to a separation process to separating the organogermanium compounds and inorganogermanium compounds. The alkaline matrix-removed extract is applied into a combination column. The combination column is packed with a cation exchange resin at the lower part and packed with an anion exchange resin at the upper part. Since it is proven that the organogermanium compound may be present in the form of an acid type polymer, therefore, the organogermanium compounds can bind with the anion exchange resin at the upper part. Then, deionized water is used to wash the combination column, and the obtained eluate is the inorganogermanium solution containing substantially no organogermanium compounds.

In order to further elute out the organogermanium compounds retained in the combination column, according to the present invention, an alkaline solution can be used to elute the combination column. In this way, the organogermanium compounds originally bound with the anion exchange in the upper part release and flow to the lower part of the column. For the reasons as mentioned above, the alkaline matrix in the alkaline solution can be removed by the cation exchange resin in the lower part of the column. Finally, washing the combination column with deionized water obtains the organogermanium solution containing substantially no inorganogermanium compounds.

Anion exchange resin suitable for use in the combination column of the present invention can be an acetic acid type, and the functional group of the anion exchange resin can be $-CH_2N^+(CH_3)_3$. Representative commercially available examples of such anion exchange resins include Dowex 1-X2, AG 1-X2, Amberlite CG-400 and Duolite 113. Cation exchange resin suitable for use in the combination column of the present invention can be a hydrogen ion type, and the functional group of the cation exchange resin can be $-SO_3^-$. Representative commercially available examples of such cation exchange resins include Dowex 50W-X8, AG 50W-X8, Amberlite CG-120 and Duolite 225.

The process for separating organogermanium and inorganogermanium compounds of the present invention can be applied to any germanium-containing pharmaceutical plant or its processed product. The germanium-containing pharmaceutical plant described in the present invention can be a Chinese crude drug, for example, *Ganoderma spp., Panax spp., Fomes spp., Grifola spp., Glycyrrhiza spp., Wistaria spp., Poria spp., Heyotis spp., Magnolia spp., Asparagus spp., Lonicera spp., Astragalus spp., Curcuma spp., Lycii spp., chlorella or Agropyron spp*. Representative examples of the germanium-containing pharmaceutical plant include *Ganoderma lucidum, Ganoderma neo-japonicum, Ganoderma tsugae, Ganoderma sessile, Ganoderma applanatum, Panax ginseng, Panax quinquefolium, Fomes pinicola, Grifola umbellata, Glycyrrhiza uralensis, Wistaria sinensis, Poria cocos, Heyotis diffusa, Magnolia officinalis, Asparagus cochinchinensis, Lonicera affimis, Astragalus membranaceus, Curcuma Zedoaria, and Lycii fructus*, while not limited to the above mentioned.

The processed products suitable for use in the present invention can be in various forms, for example, tablets, capsules, microcapsules, powders and beverages.

If the processed product of the germanium-containing pharmaceutical plant is a solid, an extraction step should be employed before separating the organogermanium and inorganogermanium compounds by the combination column of the present invention. The extraction can be employed by any conventional method or the extraction method of the present invention. If the processed product of the germanium-containing pharmaceutical plant is a liquid (such as beverage), after the liquid is subjected to an ordinary filtration step, then can be applied into the combination column of the present invention for separating the organogermanium and inorganogermanium compounds, no extraction step is required.

It is the first time that the present invention uses ICP-AES to analyze the germanium content of a germanium-containing pharmaceutical plant or its processed products. When the processed product of the germanium-containing pharmaceutical plant is a solid, the solid sample should be first extracted (by any conventional method or the extraction method of the present invention), and then determined the total Ge content by ICP-AES. When the processed product of the germanium-containing pharmaceutical plant is a liquid (such as beverage), the liquid sample may be subjected to an ordinary filtration step, then determined the total Ge content by ICP-AES. If one wants to know the respective organogermanium and inorganogermanium contents, then, the extract of the germanium-containing pharmaceutical plant or its processed products may be subjected to the special separation process according to the present invention, that is, applied into the combination column (packed with a cation exchange resin in the lower part and an anion exchange resin in the upper part), and then determined by ICP-AES.

The following examples are intended to demonstrate this invention more fully without limiting its scope, since numerous modifications and variations will be apparent to those skilled in the art.

EXAMPLE 1

Culturing of *Ganoderma spp.*:

Mycelia of *Ganoderma lucidum* was cultured in a germanium dioxide-enriched solid medium in P.P. (polypropylene) bags. The formulation of each bag of the solid medium includes 350 g of wood crumbs, 125 g of rice bran, 5 g of urea, 10 g of cane sugar, 10 g of calcium carbonate, and 200 ppm of germanium dioxide. The conditions for the growth of *Ganoderma lucidum* were according to Chiang (Chiang et al., 1989, *Journal of the Taiwan Pharmaceutical Association*, Vol. 41, No. 4, p.339–344). The grown fruit body of *Ganoderma lucidum* was harvested and dried at 90° C. for 2 hours. Then, the dried fruit body was homogenized, divided into sample vials, and stored at room temperature.

Preparation of secondary deionized water:

The deionized water used in the examples of the present invention was prepared as follows. First, distilled water was treated with cation exchange resin and reverse permeation to obtain first deionized water. Then, the first deionized water was treated with mixed typed nuclear grade ion exchange resin and LLI-QSP reagent water system of Millipore to obtain secondary deionized water of 18.3 MΩ-cm.

Preparation of separation column A (Dowex 50W-X8 resin separation column):

Dowex 50W-X8 resin (a cation exchange resin) was packed into an 20 mL of Econo-Pac column (1.5 cm×12 cm) to about 10 mL. A polymer separator was disposed on the upper surface of the resin, and then the prepared column A was washed with secondary deionized water for several times. **Dowex 50W-X8($H^+$) resin, cross-linkage: 8%, 50–100 mesh, purchased from Sigma.

Preparation of separation column B (the combination column of Dowex 1-X2($CH_3COO^-$) resin and Dowex 50W-X8 resin):

Dowex 50W-X8 resin was packed into a 20 mL of Econo-Pac column (1.5 cm×12 cm) to about 10 mL, and a polymer separator was disposed on the upper surface of the cation exchange resin. Then, Dowex 1-X2($CH_3COO^-$) resin (an anion exchange resin) was packed above the cation exchange resin into the Econo-Pac column to about 1 mL, and another polymer separator was disposed on the upper surface of the anion exchange resin. Finally, the prepared column B was washed with secondary deionized water for several times. **Dowex 1-X2($CH_3COO^-$) resin, cross-linkage: 2%, 50–100 mesh, purchased from Sigma.

ICP-AES:

The instrument for inductively coupled plasma atomic emission spectroscopy (ICP-AES) is Jobin Yvon 24 Inductively coupled plasma atomic emission spectroscopic (ISA Jobin Yvon, Longjumeau, Paris, France), Sequential spectrometer. The sample was determined by ICP-AES at wavelength of 206.86 nm.

Extract of *Ganoderma spp.*:

The homogenized $GeO_2$-enriched Ganoderma fruit body was extracted by 250 mL of 0.01N NaOH and refluxed in the hot water bath for 2 hours. The resulting mixture was filtered through a filter paper and the filtrate was recovered. The extraction was repeated for three times. The combined fitrate was concentrated and then the alkaline matrix of the fitrate was removed by separation column A using secondary deionized water as eluent. The eluate was collected to afford the extract of Ganoderma.

Separation of organogermanium and inorganogermanium compounds from *Ganoderma spp.*:

The alkaline matrix-removed Ganoderma extract was concentrated and then was applied to separation column B using secondary deionized water as eluent. The organogermanium compounds in Ganoderma were capable of binding to Dowex 1-X2 in the upper part of column B, and the inorganogermanium compounds in Ganoderma were not capable of binding to Dowex 1-X2. Thus, the eluate collected was inorganogermanium solution substantially containing no organogermanium compounds. The eluate was then concentrated and determined the Ge content by ICP-AES to be 519.65 µg/g.

Subsequently, separation column B was eluted with 3N NaOH to release the organogermanium compounds previously bound with Dowex 1-X2. At the same time, the alkaline matrix in the organogermanium compounds was removed by Dowex 50W-X8 in the lower part of column B. Finally, column B was eluted with secondary deionized water, and the eluate collected was organogermanium solution substantially containing no inorganogermanium compounds. The eluate was then concentrated and determined the Ge content by ICP-AES to be 99.43 µg/g.

Recovery of the separated organogermanium and inorganogermanium compounds:

1 g of the fresh homogenized $GeO_2$-enriched Ganoderma fruit body was extracted, applied to column A to remove alkaline matrix, and eluted with deionized water according to the above-mentioned procedures, while the step of applying to column B was not employed. The eluate collected from column A was concentrated and then was determined the total germanium content by ICP-AES to be 637.94 µg/g.

Therefore, the recovery of the separated organogermanium and inorganogermanium compounds= (organogermanium content+inorganogermanium content)/total germanium content×100%=97.04%. The results show that the recovery is relatively high.

What is claimed is:

1. A process for separating organogermanium compounds and inorganogermanium compounds from a germanium-containing pharmaceutical plant or its processed products, comprising the following sequential steps of:
   (a) providing an extract from a germanium-containing pharmaceutical plant or its processed products;
   (b) applying the extract into a combination column including a cation exchange resin in the lower part of the column and an anion exchange resin in the upper part of the column, whereby organogermanium compounds in the extract is capable of binding with the anion exchange resin in the upper part of the column;
   (c) eluting the combination column with deionized water and collecting the eluate so as to obtain inorganogermanium solution containing substantially no organogermanium compounds;
   (d) eluting the combination column with an alkaline solution, whereby the organogermanium compounds previously bound with the anion exchange resin release, and the alkaline matrix of the alkaline solution binds with the cation exchange resin in the lower part of the column; and
   (e) eluting the combination column with deionized water and collecting the eluate so as to obtain organogermanium solution containing substantially no inorganogermanium compounds.

2. The process as claimed in claim 1, wherein the cation exchange resin is a hydrogen ion type.

3. The process as claimed in claim 1, wherein the cation exchange resin has a functional group of $-SO_3^-$.

4. The process as claimed in claim 1, wherein the anion exchange resin is a $CH_3COO^-$ type.

5. The process as claimed in claim 1, wherein the anion exchange resin has a functional group of $-CH_2N^+(CH_3)_3$.

6. The process as claimed in claim 1, wherein the alkaline solution used in step (d) is a solution of a hydroxide of an alkaline metal or an alkaline earth metal.

7. The process as claimed in claim 6, wherein the alkaline solution used in step (d) is sodium hydroxide.

8. The process as claimed in claim 1, wherein the germanium-containing pharmaceutical plant is selected from the group consisting of *Ganoderma spp.*, *Panax spp.*, *Fomes spp.*, *Grifola spp.*, *Glycyrrhiza spp.*, *Wistaria spp.*, *Poria spp.*, *Heyotis spp.*, *Magnolia spp.*, *Asparagus spp.*, *Lonicera spp.*, *Astragalus spp.*, *Curcuma spp.*, *Lycii spp.*, *chlorella* and *Agropyron spp.*

9. The process as claimed in claim 1, wherein the germanium-containing pharmaceutical plant is selected from the group consisting of *Ganoderma spp.*

10. The process as claimed in claim 1, wherein the extract of a processed product of a germanium-containing pharmaceutical plant is a germanium-containing pharmaceutical plant beverage.

11. The process as claimed in claim 1, wherein the extract of a germanium-containing pharmaceutical plant or its processed products used in step (a) is obtained from the following sequential steps of:
   (a1) extracting the germanium-containing pharmaceutical plant or its processed products with an alkaline solution;
   (a2) applying the extract obtained from step (a1) into a column packed with a cation exchange resin to remove the alkaline matrix of the alkaline solution; and
   (a3) eluting the cation exchange resin packed column with deionized water and collecting the eluate.

12. The process as claimed in claim 11, wherein the alkaline solution used in step (a1) is a solution of a hydroxide of an alkaline metal or an alkaline earth metal.

13. The process as claimed in claim 12, wherein the alkaline solution used in step (a1) is sodium hydroxide.

14. A process for determining the content of inorganogermanium compounds in a germanium-containing pharmaceutical plant or its processed products, comprising determining the germanium content of the inorganogermanium solution substantially containing no organogermanium compounds obtained from claim 1(c) by ICP-AES.

15. A process for determining the content of the organogermanium compounds in a germanium-containing pharmaceutical plant or its processed products, comprising determining the germanium content of the organogermanium solution substantially containing no inorganogermanium compounds obtained from claim 1(e) by ICP-AES.

* * * * *